US009481540B2

(12) United States Patent
Miyajima

(10) Patent No.: US 9,481,540 B2
(45) Date of Patent: Nov. 1, 2016

(54) SHEET STACKING APPARATUS, METHOD OF CONTROLLING SHEET STACKING APPARATUS, AND STORAGE MEDIUM

(71) Applicant: CANON KABUSHIKI KAISHA, Tokyo (JP)

(72) Inventor: Jun Miyajima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/699,979

(22) Filed: Apr. 29, 2015

(65) Prior Publication Data
US 2015/0314978 A1 Nov. 5, 2015

(30) Foreign Application Priority Data

May 1, 2014 (JP) ................................. 2014-094483

(51) Int. Cl.
B65H 31/24 (2006.01)
B65H 43/00 (2006.01)
B65H 29/00 (2006.01)
G06K 15/00 (2006.01)
B41J 29/38 (2006.01)
G03B 27/52 (2006.01)
B65H 31/10 (2006.01)
B65H 43/06 (2006.01)

(52) U.S. Cl.
CPC ............... B65H 31/24 (2013.01); B41J 29/38 (2013.01); B65H 29/00 (2013.01); B65H 31/10 (2013.01); B65H 43/00 (2013.01); B65H 43/06 (2013.01); G03B 27/52 (2013.01); G06K 15/403 (2013.01); B65H 2405/15 (2013.01); B65H 2405/332 (2013.01); B65H 2511/521 (2013.01); B65H 2801/06 (2013.01)

(58) Field of Classification Search
CPC ...... B65H 31/24; B65H 43/06; B65H 31/10; B65H 29/38; B65H 29/00; B65H 43/00; B65H 2405/332; B65H 2511/521; B65H 2801/06; B65H 2405/15; G06F 3/12; G03B 27/52; G06K 15/403
USPC ......................................................... 271/298
See application file for complete search history.

(56) References Cited

U.S. PATENT DOCUMENTS

| 2006/0202412 | A1 | 9/2006 | Matsue | |
|---|---|---|---|---|
| 2009/0121424 | A1* | 5/2009 | Eguchi | B65H 43/06 271/279 |
| 2009/0127771 | A1* | 5/2009 | Obuchi | B65H 31/12 271/207 |
| 2011/0031678 | A1* | 2/2011 | Iizuka | B65H 31/10 271/3.16 |
| 2011/0175284 | A1 | 7/2011 | Tanaka | |
| 2012/0001387 | A1 | 1/2012 | Mutsuno | |
| 2015/0307308 | A1* | 10/2015 | Ando | G03G 15/6538 271/176 |

FOREIGN PATENT DOCUMENTS

| JP | 2001097627 A | 4/2001 |
|---|---|---|
| JP | 2001226022 A | 8/2001 |
| JP | 2001348162 A | 12/2001 |
| JP | 2006-315812 A | 11/2006 |
| JP | 2007314320 A | 12/2007 |
| JP | 2012-12182 A | 8/2013 |

* cited by examiner

Primary Examiner — David H Bollinger
(74) Attorney, Agent, or Firm — Canon U.S.A., Inc. IP Division

(57) ABSTRACT

A sheet stacking apparatus performs control to change a sheet discharge destination from a first sheet stacking tray to a second sheet stacking tray in a case where an obstacle prevents the second sheet stacking tray from being moved down while a sheet is discharged to the first sheet stacking tray.

8 Claims, 12 Drawing Sheets

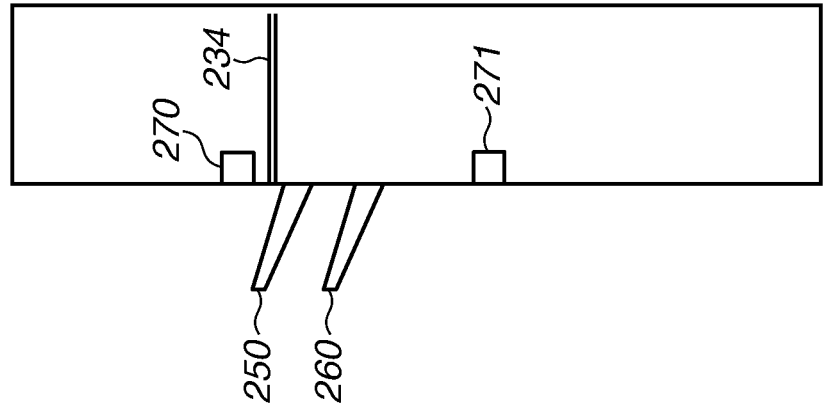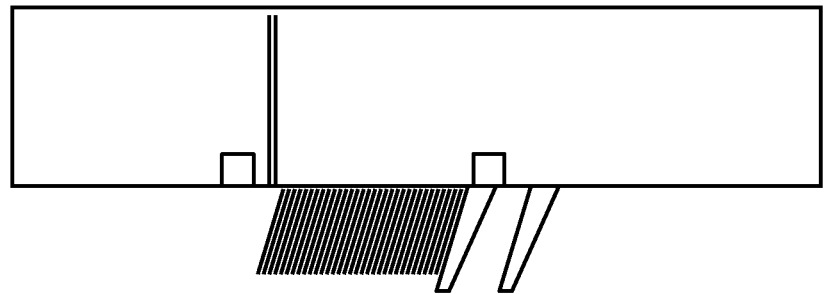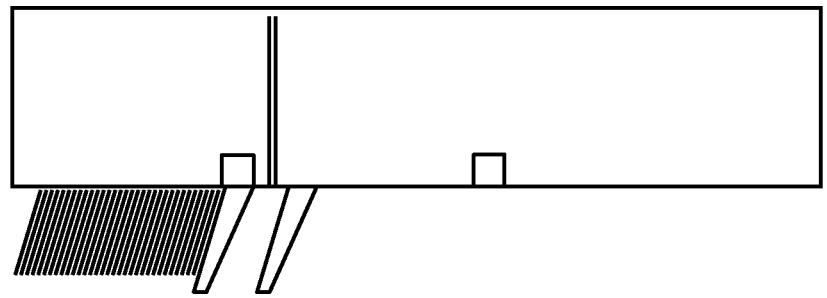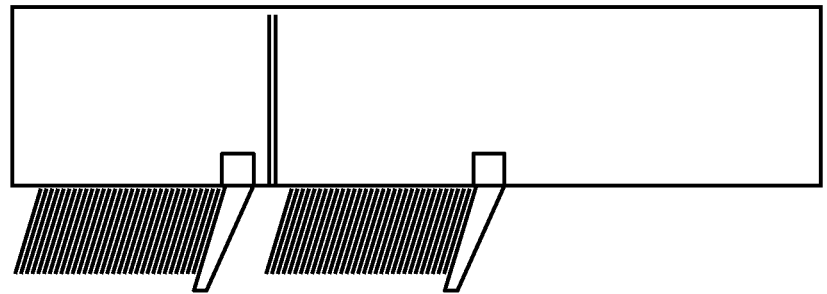

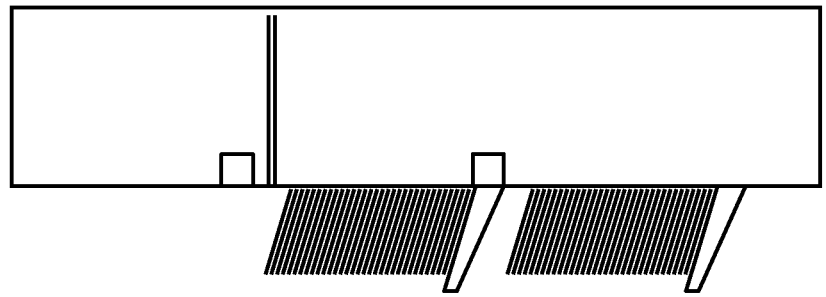
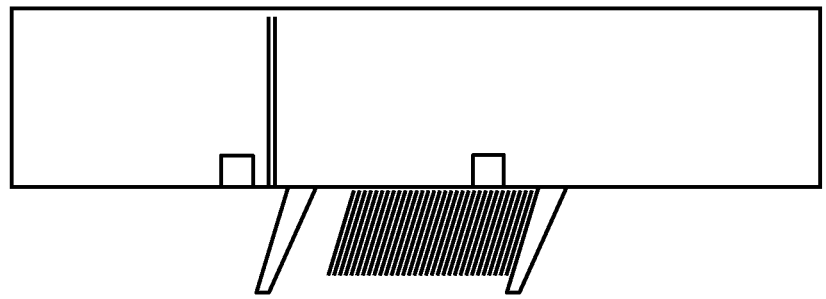
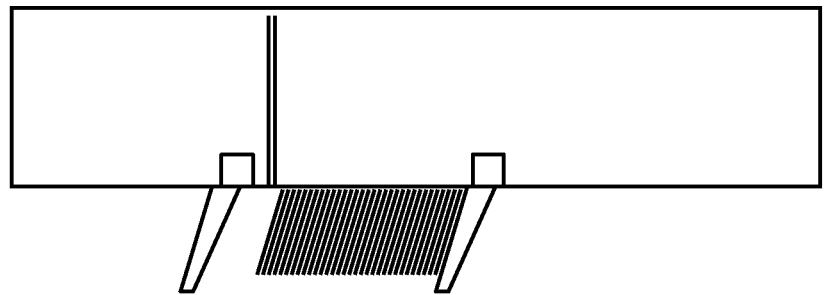
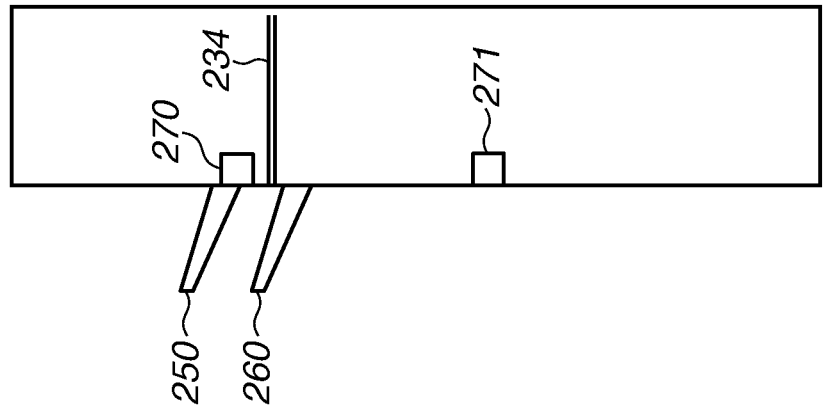

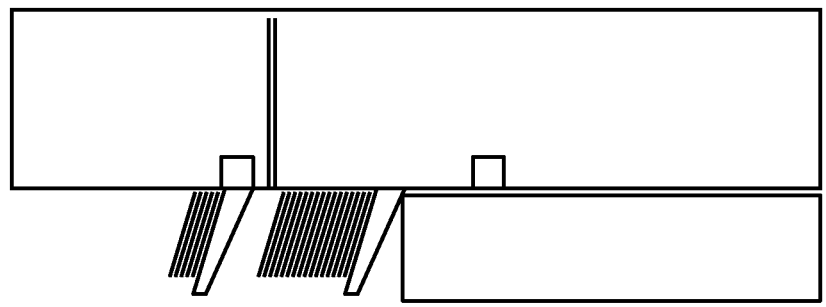
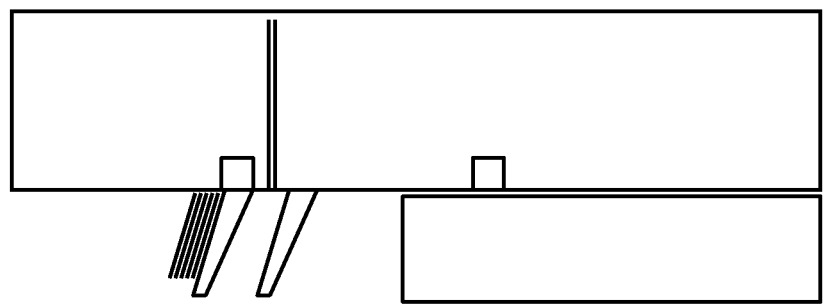
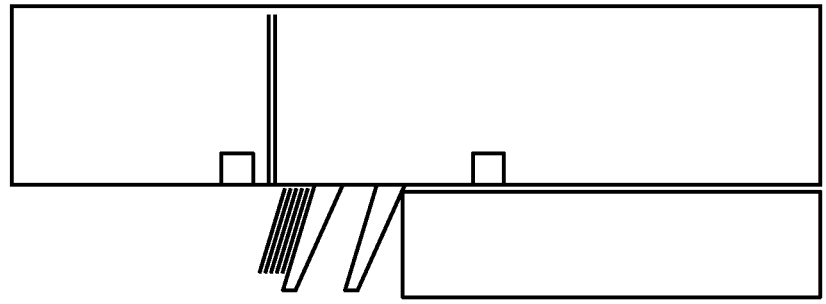
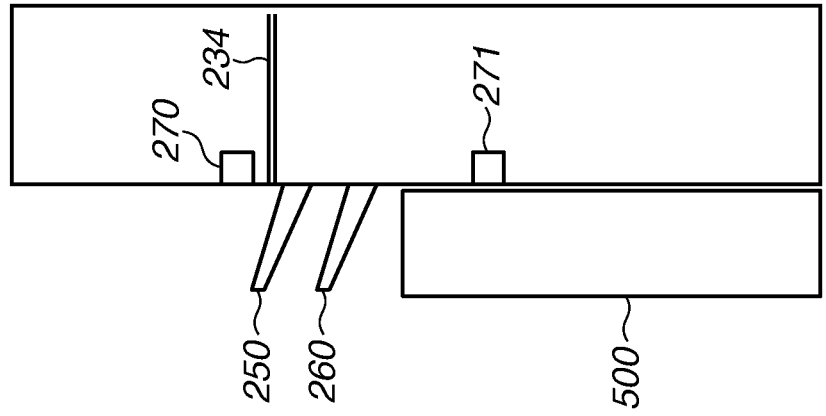

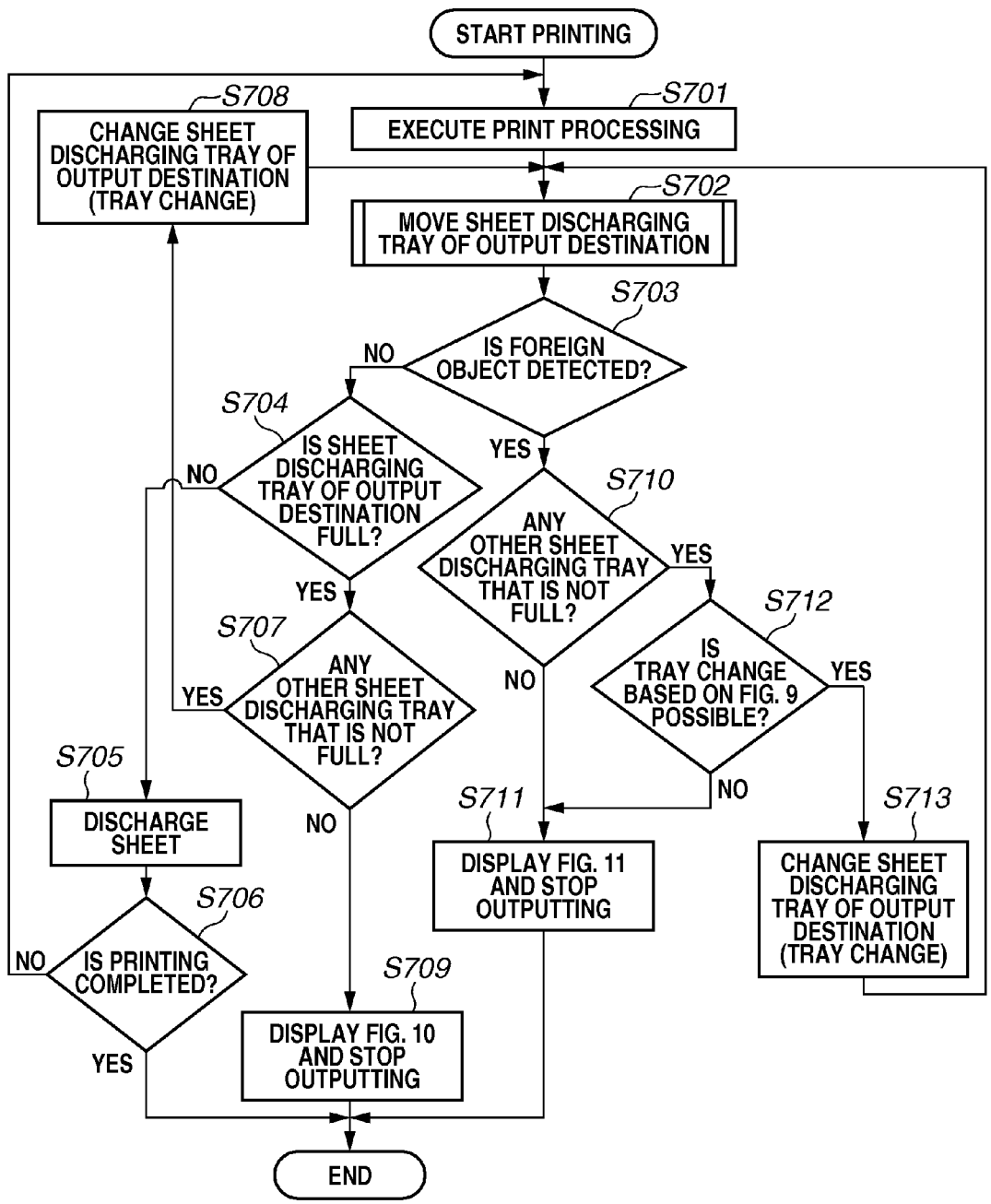

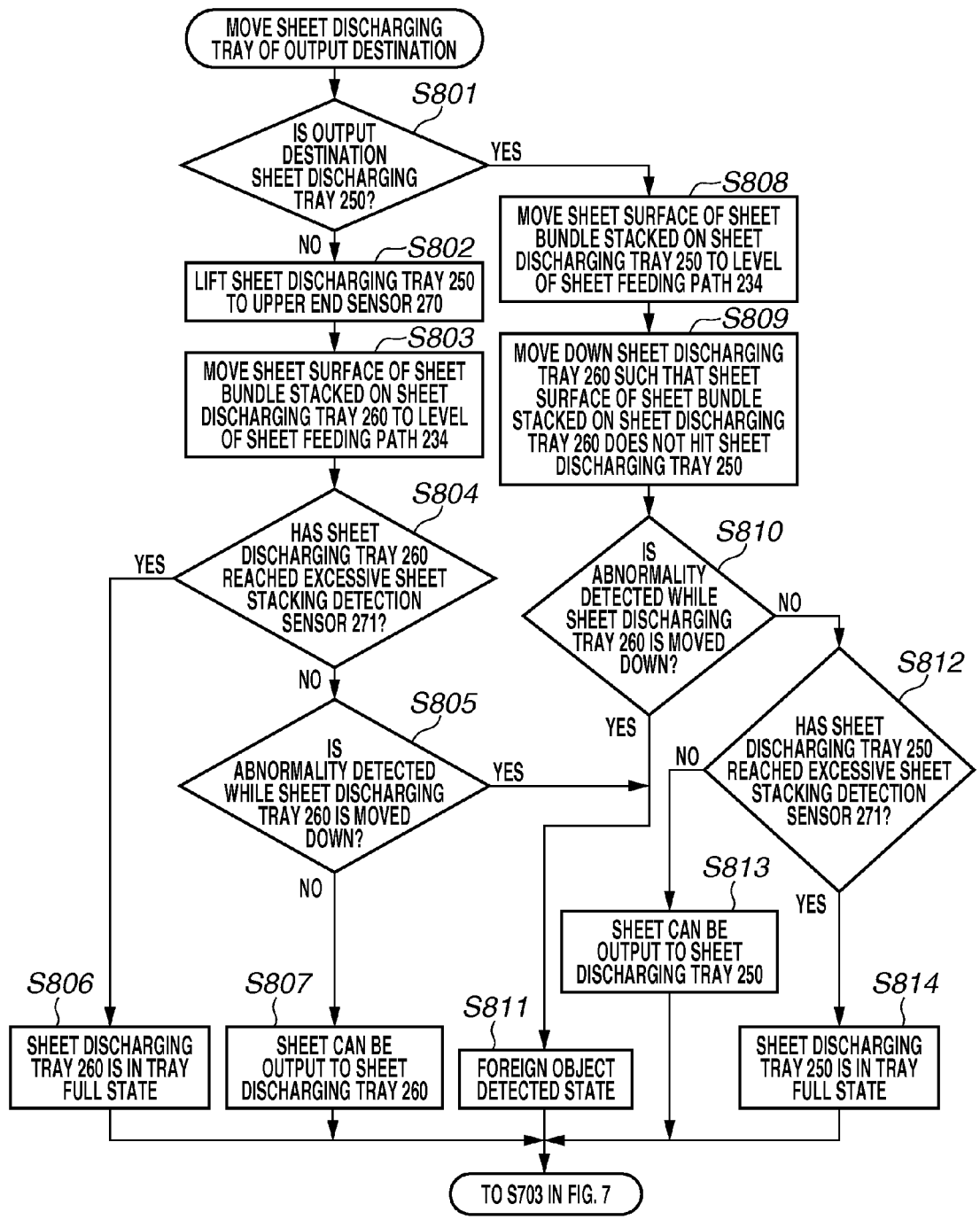

FIG.9

| CURRENT OUTPUT DESTINATION | OUTPUT DESTINATION AFTER TRAY CHANGE | POSSIBILITY OF TRAY CHANGE |
|---|---|---|
| 250 | 260 | POSSIBLE |
| 260 | 250 | NOT POSSIBLE |

FIG.10

SHEET DISCHARGING TRAY HAS BECOME FULL.
PLEASE REMOVE SHEETS STACKED ON SHEET
DISCHARGING TRAY.

FIG.11

PLEASE REMOVE SHEETS STACKED ON SHEET DISCHARGING TRAY OR REMOVE OBJECT PLACED UNDER SHEET DISCHARGING TRAY.

OBJECT UNDER SHEET DISCHARGING TRAY IS REMOVED
11001

SHEET STACKING APPARATUS, METHOD OF CONTROLLING SHEET STACKING APPARATUS, AND STORAGE MEDIUM

BACKGROUND OF THE INVENTION

1. Field of the Invention

The present invention relates to a sheet stacking apparatus, a method of controlling the sheet stacking apparatus, and a storage medium.

2. Description of the Related Art

In a conventional sheet stacking apparatus configured to discharge sheets to a sheet stacking unit that can be moved up and down, an image is printed on a sheet, and the sheet on which the image is printed is discharged from a sheet discharging port to the sheet stacking unit. As illustrated in FIG. 12A, the sheet stacking unit is moved down according to the amount of sheets stacked on the sheet stacking unit such that the uppermost surface of the sheets stacked on the sheet stacking unit is located near the sheet discharging port, whereby sheets discharged from the sheet discharging port can be stacked stably.

If an obstacle that prevents the sheet stacking unit from being moved down is placed under the sheet stacking unit as illustrated in FIG. 12B, the sheet stacking unit hits the obstacle while the sheet stacking unit is moved down. If the sheet stacking unit is forced to be moved down even after the sheet stacking unit hits the obstacle, a load is applied to a driving unit configured to move down the sheet stacking unit, and this may damage the sheet stacking unit and the driving unit. To overcome this problem, a method is discussed in which, in a case where an operation to move down a sheet stacking unit is prevented by an obstacle, a sheet discharging operation and the operation to move down the sheet stacking unit are stopped, and a warning is displayed (refer to Japanese Patent Application Laid-Open No. 2001-226022).

Meanwhile, when sheets are stacked on one sheet stacking unit, the sheet bundle may become so high that the sheet bundle may collapse. Japanese Patent Application Laid-Open No. 2012-12182 discusses a solution to this problem. Japanese Patent Application Laid-Open No. 2012-12182 discusses including two sheet stacking units so that the height of a sheet bundle stacked on the sheet discharging trays is not likely to become excessively high to prevent the sheet bundle from collapsing. Then, when excessive sheets are stacked on one of the sheet stacking units, the output is switched to the other one of the sheet stacking units to maintain the stacking capacity without decreasing the overall amount of stacks.

A space under a sheet stacking unit is convenient for storing consumables such as sheets and apparatus manuals. Further, the location of the space enables easy access to stored consumables and manuals. Furthermore, there are users considering that a print job that causes the sheet stacking unit to be moved down to the lower limit is not frequently executed. Thus, there are cases where an object is intentionally placed under the sheet stacking unit by the users.

In the case where a warning to the user is displayed when an obstacle preventing the sheet stacking unit from being moved down is detected as discussed in Japanese Patent Application Laid-Open No. 2001-226022, the user attempts to remove the obstacle in response to the warning. However, since the obstacle prevents the sheet discharging tray from being moved down, the sheet stacking unit and the obstacle are in contact with each other.

Further, in the case where there are multiple sheet stacking units as discussed in Japanese Patent Application Laid-Open No. 2012-12182, it is desired to switch the output to the other one of the sheet discharging trays to continue the output. However, if the sheet stacking unit is moved when the sheet stacking unit is in contact with the obstacle, the obstacle may be damaged, or the sheet discharging tray may be damaged to result in breakdown of the apparatus.

SUMMARY OF THE INVENTION

According to an aspect of the present invention, a sheet stacking apparatus configured to discharge a sheet to a first sheet stacking tray configured to be moved up and down and a second sheet stacking tray located below the first sheet stacking tray and configured to be moved up and down includes a discharging unit configured to discharge a sheet to the first sheet stacking tray or the second sheet stacking tray, and a control unit configured to perform control to change a destination of a sheet to be discharged by the discharging unit from the first sheet stacking tray to the second sheet stacking tray in a case where an obstacle prevents the second sheet stacking tray from being moved down while the discharging unit is discharging a sheet to the first sheet stacking tray.

Further features of the present invention will become apparent from the following description of exemplary embodiments with reference to the attached drawings.

BRIEF DESCRIPTION OF THE DRAWINGS

FIGS. 3A, 3B, 3C, and 3D illustrate stack control at the time when a tray becomes full.

FIGS. 4A, 4B, 4C, and 4D illustrate stack control at the time when a tray becomes full.

FIGS. 6A, 6B, 6C, and 6D illustrate stack control at the time when a tray becomes full.

FIG. 7 is a flowchart illustrating an example of a control method according to an exemplary embodiment of the present invention.

FIG. 8 is a flowchart illustrating an example of a control method according to an exemplary embodiment of the present invention.

FIG. 9 illustrates an example of a tray change possibility table.

FIG. 10 illustrates an example of a user interface screen to be displayed on an operation unit.

FIG. 11 illustrates an example of a user interface screen to be displayed on an operation unit.

DESCRIPTION OF THE EMBODIMENTS

Exemplary embodiments of the present invention will be described below with reference to the drawings.

Figure 1:
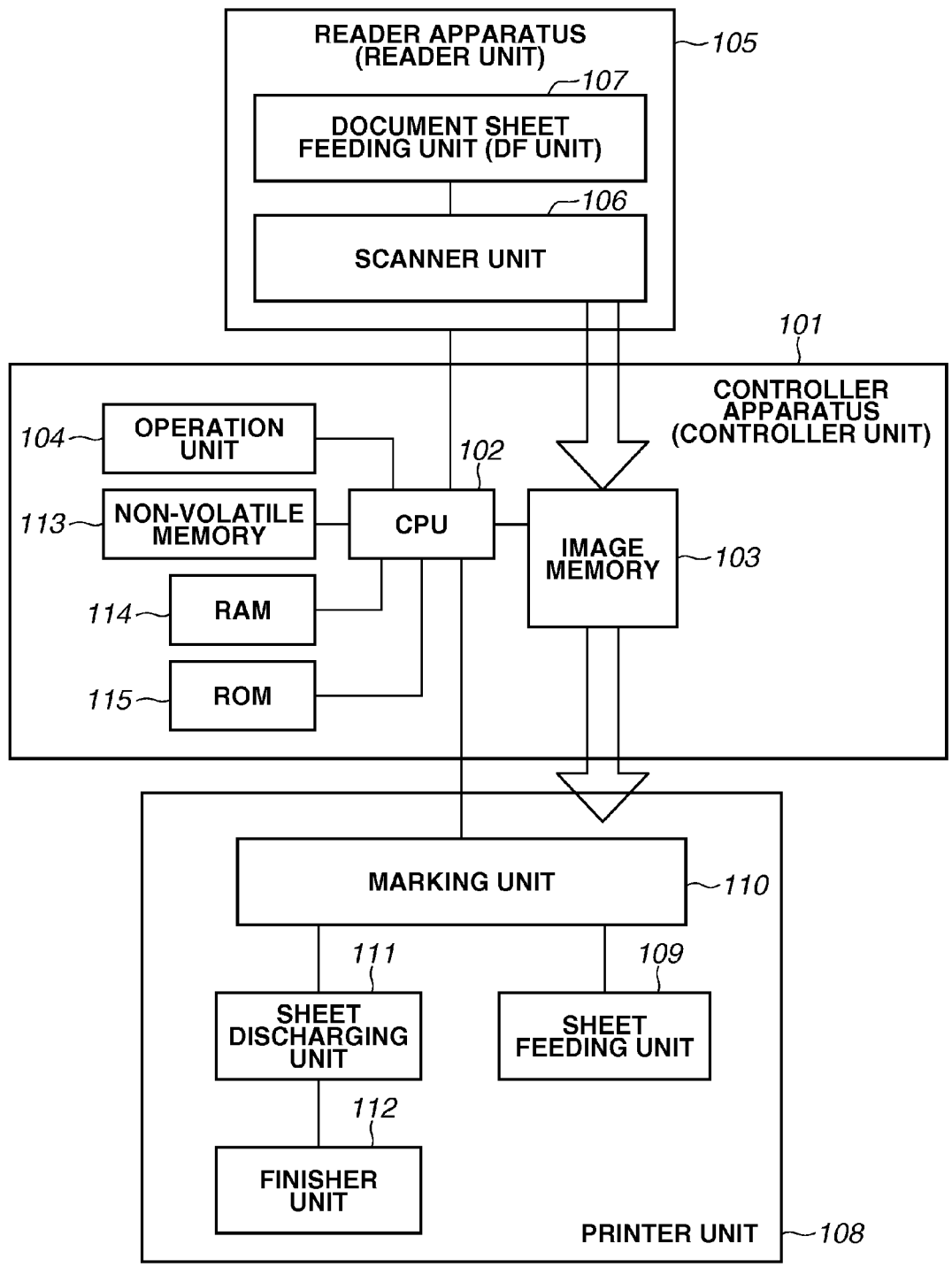
FIG. 1 is a block diagram illustrating an image forming apparatus to which a sheet stacking apparatus according to an exemplary embodiment of the present invention is applicable.

FIG. 1 is a block diagram illustrating an example of a configuration of an image forming apparatus to which a sheet stacking apparatus according to an exemplary embodiment of the present invention is applicable.

As illustrated in FIG. 1, the image forming apparatus according to the present exemplary embodiment is a multi-functional peripheral (MFP), and includes a controller apparatus 101, a reader unit 105, and a printer unit 108. While the present exemplary embodiment describes the MFP as an example, the image forming apparatus may be a single functional peripheral (SFP) including the printer unit 108 having a print function. The reader unit 105, the controller apparatus 101, and the printer unit 108 are electrically connected to send and receive control commands or data to and from one another. A finisher unit 112 is configured to be attachable to and detachable from the MFP.

The controller apparatus 101 includes a central processing unit (CPU) 102, an image memory 103, a non-volatile memory 113, a random access memory (RAM) 114, a read only memory (ROM) 115, and an operation unit 104. The CPU 102 in the controller apparatus 101 comprehensively controls the MFP by reading and executing programs stored in the ROM 115 into the RAM 114 to execute various types of control. For example, the CPU 102 controls the reader unit 105 to read image data of a document into the image memory 103 and controls the printer unit 108 to output the image data in the image memory 103 to a recording sheet, thereby providing a copy function.

The RAM 114 is used as a work area of the CPU 102 and stores various types of programs, data, etc. The ROM 115 stores various types of control programs of the CPU 102, etc., and the control programs are read and executed by the CPU 102. The image memory 103 is for storing image data. For example, the image memory 103 stores image data read by the reader unit 105 and image data received from an external personal computer (PC), etc. Image data stored in the image memory 103 is sent to the printer unit 108 in response to an instruction from the CPU 102.

The non-volatile memory 113 functions as a storage unit configured to hold data even when no power is supplied thereto. The non-volatile memory 113 stores various types of programs, image data, etc. The non-volatile memory 113 may be any non-volatile memory having a sufficient capacity to store image data, such as a hard disk drive (HDD), a digital versatile disk (DVD), a solid state drive (SSD), a Blu-ray disk, etc.

The operation unit 104 includes a display unit including a touch panel and hard keys. The operation unit 104 has functions of displaying an operation screen and receiving a user operation. The display unit of the operation unit 104 displays functions of operations of the MFP or image data according to the control by the CPU 102. Further, signals input to the touch panel or the hard keys of the operation unit 104 are transmitted to the CPU 102. Furthermore, the operation unit 104 can notify a user of the status of the MFP, guidance for operating the MFP, etc.

The MFP includes a network interface (not illustrated) in, for example, the controller apparatus 101. The MFP communicates with an external apparatus such as the PC via the network via the network interface. While the present exemplary embodiment describes the PC as an example of the external apparatus, the external apparatus may be another MFP, a mobile terminal, or a facsimile apparatus. Further, the MFP and the external apparatus may be connected to each other via a wired network or a universal serial bus (USB) cable, or may wirelessly communicate with each other using wireless fidelity (Wi-Fi).

The reader unit 105 (image input apparatus) is a unit for optically reading a document image and converting the read document image into image data. The reader unit 105 includes a scanner unit 106 and a document sheet feeding unit (DF unit) 107. The scanner unit 106 optically reads an image of a document and generates image data of the read image. The DF unit 107 feeds a document to be read by the scanner unit 106.

The printer unit (image output apparatus) 108 is a unit for printing an image on a sheet (recording sheet). A sheet feeding unit 109 feeds one by one a sheet stored in a sheet feeding cassette (described below) and such, and conveys the sheet to a marking unit 110. The sheet feeding unit 109 includes a cassette and a manual sheet feeding tray. The marking unit 110 prints an image on the fed sheet based on the image data sent from the image memory 103. The marking unit 110 may use any printing method such as an electrophotographic method and an inkjet method by which an image can be printed. Then, a sheet discharging unit 111 conveys to the finisher unit 112 the sheet on which the image has been printed by the marking unit 110.

Figure 2:
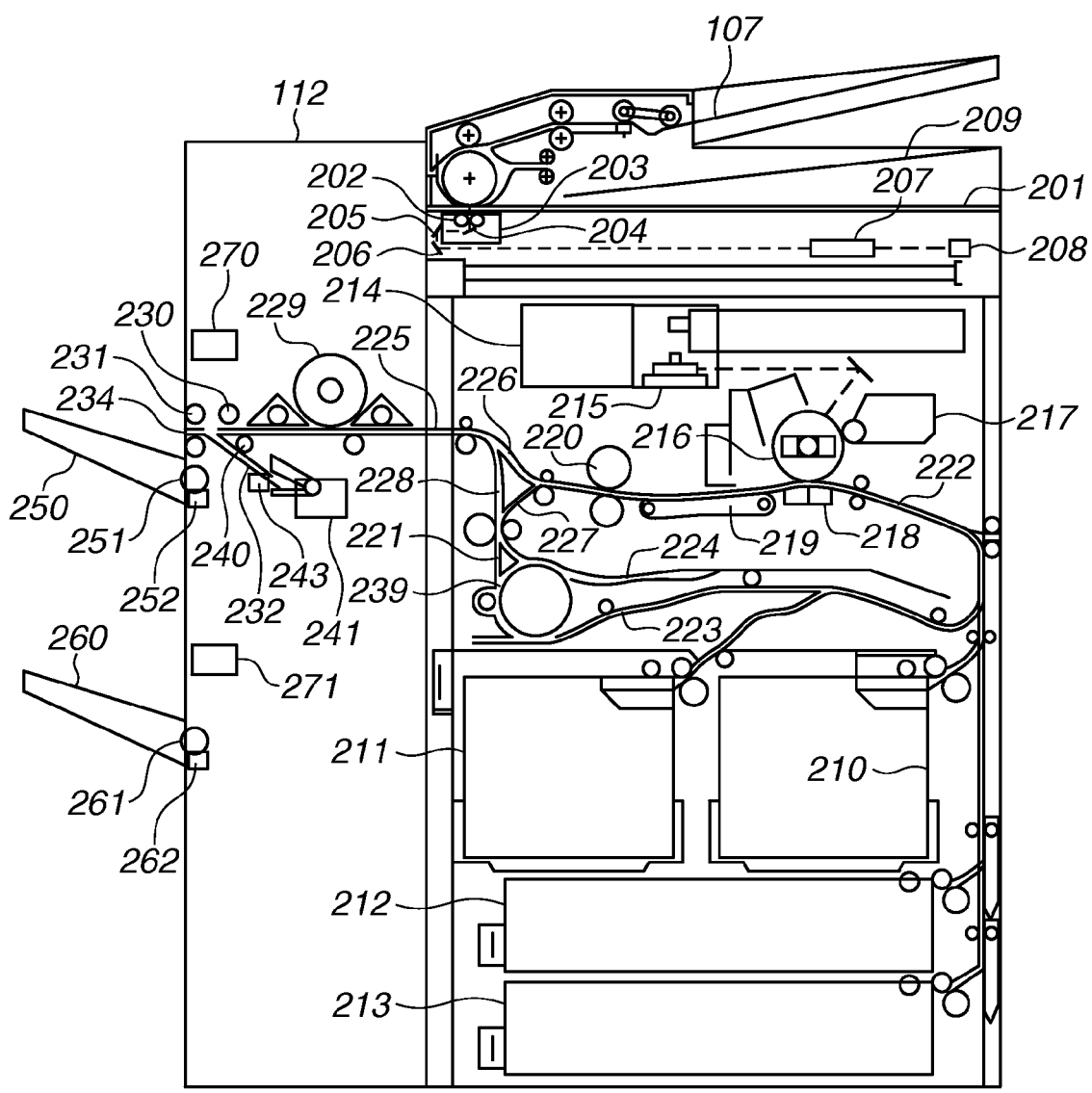
FIG. 2 is a cross sectional view illustrating a reader unit and a printer unit.

The finisher unit 112 includes multiple sheet discharging trays (e.g., sheet discharging trays 250 and 260 as illustrated in FIG. 2 described below, etc.) and stacks the conveyed sheets on the sheet discharging trays. The sheet discharging trays are an example of the sheet stacking unit, and are also referred to as a sheet stacking tray. While the present exemplary embodiment describes an exemplary case where the CPU 102 directly instructs a motor driving control unit or the like in the finisher unit 112 to control the operations of the sheet discharging trays, the finisher unit 112 may include an own CPU to send and receive data and commands to and from the CPU 102 to control the finisher unit 112. The finisher unit 112 can perform stapling processing, sorting processing, and so on.

The following describes in detail the configurations of the reader unit 105 and the printer unit 108 illustrated in FIG. 1, with reference to FIG. 2.

FIG. 2 is a cross sectional view illustrating an example of the configurations of the reader unit 105 and the printer unit 108.

The document sheet feeding unit (feeder) 107 of the reader unit 105 feeds documents one by one from the first page and conveys the fed document onto a platen glass 201. After an operation to read the conveyed document is completed, the conveyed document is discharged to a document sheet discharging tray 209.

When the document is conveyed onto the platen glass 201, the reader unit 105 turns on a lamp 202 and causes an optical unit 203 to apply light to the document. At this time, reflection light from the document is guided to a charge-coupled device (CCD) image sensor 208 (hereinafter, "CCD 208") by mirrors 204, 205, and 206 and a lens 207. Then, an image of the document is read by the CCD 208. Image data output from the CCD 208 undergoes predetermined processing and is then transferred to the controller apparatus 101.

Further, the reader unit 105 reads an image of a document placed between the document sheet feeding unit 107 and the platen glass 201. In this case, the reader unit 105 turns on the lamp 202 and moves the optical unit 203. At this time, reflection light from the document is guided to the CCD 208 by the mirrors 204, 205, and 206 and the lens 207. Then, an image of the document is read by the CCD 208. Image data output from the CCD 208 undergoes predetermined processing and is then transferred to the controller apparatus 101. While the present exemplary embodiment describes the exemplary case where the image of the document is read by the CCD 208, the image of the document may be read by a contact image sensor (CIS). In the case of reading the image of the document by the CIS, the mirrors 204, 205, and 206 and the lens 207 are unnecessary, and the CIS is disposed in the position of the optical unit 203.

In the printer unit 108, a laser driver 214 drives a laser light emitting unit 215 to cause the laser light emitting unit 215 to emit laser light corresponding to image data output from the image memory 103 of the controller apparatus 101. The laser light irradiates a photosensitive drum 216 to form thereon a latent image corresponding to the laser light. A developing agent is applied to a portion of the latent image of the photosensitive drum 216 by a developing unit 217.

Further, the printer unit 108 includes, as the sheet feeding unit 109, cassettes 210, 211, 212, and 213, each of which is in the shape of a drawer. The user can replenish sheets by pulling out the sheet feeding cassette, refilling the sheet feeding cassette with sheets, and then closing the sheet feeding cassette. The printer unit 108 may further include a manual sheet feeding tray as the sheet feeding unit 109.

The printer unit 108 feeds a recording sheet (sheet) from one of the cassettes 210, 211, 212, and 213, and the manual sheet feeding tray, and conveys the recording sheet to a transfer unit 218 through a sheet feeding path 222. The transfer unit 218 transfers the developing agent applied to the photosensitive drum 216 onto the recording sheet. The recording sheet on which the developing agent has been transferred is conveyed to a fixing unit 220 by a conveyor belt 219, and the developing agent is fixed to the recording sheet by heat and pressure applied by the fixing unit 220. Thereafter, the recording sheet having passed through the fixing unit 220 is conveyed through sheet feeding paths 226 and 225 to be discharged. In a case of reversing the printed surface of the recording sheet and then discharging the recording sheet, the recording sheet having passed through the fixing unit 220 is guided to sheet feeding paths 227 and 239. From the sheet feeding paths 227 and 239, the recording sheet is conveyed in an opposite direction through sheet feeding paths 228 and 225 to be discharged.

In a case where two-sided printing is set, a recording sheet having passed through the fixing unit 220 is conveyed through the sheet feeding path 227 and then guided to a sheet feeding path 224 by a flapper 221. Thereafter, the recording sheet is conveyed in an opposite direction and guided to the sheet feeding path 239 by the flapper 221 and then to a sheet re-feeding path 223. The recording sheet guided to the sheet re-feeding path 223 is conveyed through the sheet feeding path 222 at the timing described above and then conveyed to the transfer unit 218. The developing agent is transferred by the transfer unit 218 to a second surface, which is different from a first surface on which the image has already been transferred by the transfer unit 218. Then, the recording sheet is guided to the sheet feeding path 225 through the fixing unit 220.

In either case of one-sided recording and two-sided recording, the recording sheet conveyed through the sheet feeding path 225 is conveyed to the finisher unit 112.

The recording sheet conveyed to the finisher unit 112 is first sent to a buffer unit 229. In the buffer unit 229, the conveyed recording sheet is wound around a buffer roller as needed and buffered. For example, in a case where processing such as stapling processing that is to be performed downstream takes time, the buffer unit 229 is used to adjust the conveyance interval of recording sheets conveyed from the main body. Thereafter, the recording sheet is conveyed through a sheet feeding path 234 at a pair of upstream discharging rollers 230 and a pair of downstream discharging rollers 231 to be discharged to the sheet discharging tray 250 or 260.

In a case where shift sorting or stapling is set, immediately after the recording sheet conveyed by the pair of upstream discharging rollers 230 leaves the pair of upstream discharging rollers 230, the pair of downstream discharging rollers 231 are rotated backward while a downstream end portion of the recording sheet is nipped by the pair of downstream discharging rollers 231, whereby the recording sheet is stacked on a stack tray 232. The stack tray 232 includes a stack tray sheet presence/absence detection sensor 243 configured to detect a sheet on the stack tray 232.

In the case where the shift sorting is designated, when a sheet bundle of one copy set has been stacked on the stack tray 232, the sheet bundle stacked on the stack tray 232 is shifted rightward or leftward by a predetermined amount from a sheet bundle discharged immediately before the sheet bundle and then discharged to the sheet discharging tray 250 or 260. In this way, the user can easily recognize each copy set. The width (the predetermined amount) by which the sheet bundle is to be shifted is set to, for example, 1 cm but may be any width other than 1 cm.

Further, in the case where the stapling is designated, when a sheet bundle of one copy set has been stacked on the stack tray 232, a stapling unit performs stapling processing on the sheet bundle stacked on the stack tray 232. The stapled sheet bundle is discharged to the sheet discharging tray 250 or 260 by the pair of downstream discharging rollers 231.

The finisher unit 112 according to the present exemplary embodiment includes two sheet discharging trays, the sheet discharging trays 250 and 260. The upper sheet discharging tray is referred to as the sheet discharging tray 250, and the lower sheet discharging tray as the sheet discharging tray 260. Alternatively, the finisher unit 112 may include three or more sheet discharging trays. Stated differently, the MFP according to the present exemplary embodiment includes multiple sheet stacking units. If sheets are stacked on one sheet discharging tray, the height of the sheet bundle may become excessively high, and the sheet bundle may collapse. To solve this problem, the sheets are stacked on multiple sheet discharging trays so that the height of a sheet bundle stacked on the sheet discharging trays is not likely to become excessively high to prevent the sheet bundle from collapsing.

In the finisher unit 112, the sheet discharging trays 250 and 260 can be moved up and down by a motor unit according to the amount of sheets stacked on the sheet discharging trays 250 and 260. A raising/lowering motor 251 is configured to move up and down the sheet discharging tray 250. Further, a raising/lowering motor 261 is configured to move up and down the sheet discharging tray 260. The raising/lowering motors 251 and 261 operate in response to an instruction from the CPU 102. For example, the raising/lowering motor 251 is rotated forward in response to an instruction from the CPU 102 to move up the sheet discharging tray 250, whereas the raising/lowering motor 251 is rotated backward to move down the sheet discharging tray 250. Further, the raising/lowering motor 261 is rotated forward in response to an instruction from the CPU 102 to move up the sheet discharging tray 260, whereas the raising/lowering motor 261 is rotated backward to move down the sheet discharging tray 260.

In the finisher unit 112, information about the position of the sheet discharging tray 250 having been moved up or down can be acquired by a position detecting unit 252. Further, information about the position of the sheet discharging tray 260 having been moved up or down can be acquired by a position detecting unit 262.

A "sheet discharging tray 250 upper end sensor" 270 is a sensor for determining that the sheet discharging tray 250 has reached an upper limit of a movable range as a result of a raising operation. The "sheet discharging tray 250 upper end sensor" 270 is located in a retreat position of the sheet discharging tray 250 during the stacking of sheets on the sheet discharging tray 260 and is configured to detect that the sheet discharging tray 250 has reached the retreat position.

An "excessive sheet stacking detection sensor" 271 is a sensor for determining an upper limit of a stack in the case of moving down the sheet discharging tray 250 or 260 according to the amount of sheets stacked on the sheet discharging tray 250 or 260. The "excessive sheet stacking detection sensor" 271 is located in a lower limit position of the sheet discharging tray 260. The CPU 102 gradually moves down both the sheet discharging trays 250 and 260 while sheets are stacked. Then, when the sheet discharging tray on which the sheets are stacked reaches the position of the "excessive sheet stacking detection sensor" 271, the CPU 102 detects that the sheet discharging tray has become full and performs control to stack no more sheet on the sheet discharging tray. Then, if there is another sheet discharging tray that does not have an excessive stack of sheets (sheet discharging tray that is not full) at the time when the sheet discharging tray 250 or 260 reaches the position of the "excessive sheet stacking detection sensor" 271, the CPU 102 performs control to switch the sheet discharging tray.

The sheet discharging trays 250 and 260 include a sheet presence/absence detection sensor (not illustrated). The sheet presence/absence detection sensor is configured to detect the presence/absence of a sheet stacked on the sheet discharging trays 250 or 260. The sheet presence/absence detection sensor detects a sheet stacked on the sheet discharging tray 250 or 260 by, for example, detecting that a switch protruding on the sheet discharging tray 250 or 260 is pushed down by the weight of the sheet. The switch can be pushed down even by the weight of one sheet. If a sheet is present on the sheet discharging tray 250 or 260, the sheet presence/absence detection sensor sends the CPU 102 a signal indicating the presence of the sheet. On the other hand, if no sheet is present on the sheet discharging tray 250 or 260, the sheet presence/absence detection sensor sends the CPU 102 a signal indicating the absence of a sheet. The CPU 102 receives the signals from the sheet presence/absence detection sensor to determine whether there is a sheet on the sheet discharging trays 250 or 260.

The MFP having the foregoing functions can execute multiple types of jobs.

For example, the MFP executes a copy job by reading an image of a document using the reader unit 105, generating image data indicating the read document image, and printing an image on a sheet based on the image data and settings received via the operation unit 104. Further, the MFP executes a print job by analyzing print data received from the PC, generating image data based on print settings received from the PC, and printing an image on a sheet based on the generated image data. Furthermore, the MFP executes a fax/print job by receiving code data from an external facsimile apparatus via a telephone line, converting the received code data into image data, and printing an image on a sheet based on the converted image data.

The MFP receives multiple jobs described above and sequentially stores the received jobs in the non-volatile memory 113, and the CPU 102 executes the jobs in the order the jobs have been stored in the non-volatile memory 113. While the present exemplary embodiment describes that the MFP executes multiple types of jobs, this is not a limiting case. The MFP only needs to be capable of executing some of the multiple types of jobs.

FIGS. 3A to 3D, 4A to 4D, 5A, 5B, and 6A to 6D are schematic diagrams illustrating stack control at the time when a sheet discharging tray becomes full.

FIGS. 3A to 3D are schematic diagrams illustrating a case where sheets are stacked on the sheet discharging tray 250 located above and thereafter on the sheet discharging tray 260 located below.

FIG. 3A first illustrates a state in which no sheet is stacked on either of the sheet discharging trays 250 and 260. Next, sheets are stacked on the sheet discharging tray 250 as illustrated in FIG. 3B. Each time a sheet is stacked on the sheet discharging tray 250, the CPU 102 gradually moves down the sheet discharging tray 250 to bring the height of the sheet surface to the level of the sheet feeding path 234. Then, when the sheet discharging tray 250 having been moved down reaches the "excessive sheet stacking detection sensor" 271, the CPU 102 determines that the sheet discharging tray 250 has an excessive stack of sheets (the sheet discharging tray 250 becomes full), and the CPU 102 changes the sheet discharging tray to stack subsequent sheets on the sheet discharging tray 260.

By gradually moving down the sheet discharging tray each time a sheet is stacked on the sheet discharging tray to bring the height of a surface of the sheet to the level of the sheet feeding path 234 as described above, the following effects can be obtained. The sheets stacked on the sheet discharging tray can be prevented from blocking the sheet discharging port so that a sheet can be prevented from being discharged. Further, the sheet discharging tray is moved up and down to locate the uppermost surface of the sheets near the sheet discharging port so that sheets discharged from the sheet discharging port can be stacked stably. While the present exemplary embodiment describes the exemplary case where the sheet discharging tray is moved down each time one sheet is discharged, the sheet discharging tray may be moved down each time a predetermined number of sheets that is two or more are discharged in a bundle. For example, the sheet discharging tray may be moved down each time ten sheets are discharged. In other words, the CPU 102 only needs to be configured to move down the sheet discharging tray 250 or 260 according to the amount of sheets stacked on the sheet discharging tray 250 or 260.

Then, FIG. 3C illustrates a state immediately after the sheet discharging tray is changed from the sheet discharging tray 250 to the sheet discharging tray 260. The CPU 102 moves up the sheet discharging tray 250, on which excessive sheets are stacked, to the point of the "sheet discharging tray 250 upper end sensor" 270, and moves the sheet discharging tray 260 to the level of the sheet feeding path 234. Finally, sheets are stacked on the sheet discharging tray 260 as illustrated in FIG. 3D. Each time a sheet is stacked on the sheet discharging tray 260, the CPU 102 gradually moves down the sheet discharging tray 260 to bring the height of the sheet surface to the level of the sheet feeding path 234. When the sheet discharging tray 260 having been moved down reaches the "excessive sheet stacking detection sensor" 271, the CPU 102 determines that the sheet discharging tray 260 has an excessive stack of sheets (the sheet discharging tray becomes full). When the sheet discharging trays 250 and 260 both have an excessive stack of sheets, the CPU 102 stops outputting.

FIGS. 4A to 4D are schematic diagrams illustrating a case where sheets are stacked on the sheet discharging tray 260 located below and thereafter on the sheet discharging tray 250 located above.

FIG. 4A first illustrates a state in which no sheet is stacked on either of the sheet discharging trays 250 and 260. Next, sheets are stacked on the sheet discharging tray 260 as illustrated in FIG. 4B. Each time a sheet is stacked on the sheet discharging tray 260, the CPU 102 gradually moves down the sheet discharging tray 260 to bring the height of the surface of the sheet to the level of the sheet feeding path 234. When the sheet discharging tray 260 having been moved down reaches the "excessive sheet stacking detection sensor" 271, the CPU 102 determines that the sheet discharging tray 260 has an excessive stack of sheets, and the CPU 102 changes the sheet discharging tray to stack subsequent sheets on the sheet discharging tray 250. The excessive stack of sheets is also referred to as the sheet discharging tray full.

Then, FIG. 4C illustrates a state immediately after the sheet discharging tray is changed from the sheet discharging tray 260 to the sheet discharging tray 250. The CPU 102 moves down the sheet discharging tray 250 to bring the sheet discharging tray 250 to the level of the sheet feeding path 234. Simultaneously, the CPU 102 also moves down the sheet discharging tray 260 so that the sheets stacked on the sheet discharging tray 260 will not hit the sheet discharging tray 250. Then, sheets are stacked on the sheet discharging tray 250 as illustrated in FIG. 4D. Each time a sheet is stacked on the sheet discharging tray 250, the CPU 102 gradually moves down the sheet discharging tray 250 to bring the height of the surface of the sheet to the level of the sheet feeding path 234. Simultaneously, the CPU 102 also moves down the sheet discharging tray 260 so that the sheets stacked on the sheet discharging tray 260 will not hit the sheet discharging tray 250. When the sheet discharging tray 250 having been moved down reaches the "excessive sheet stacking detection sensor" 271, the CPU 102 determines that the sheet discharging tray 250 has an excessive stack of sheets. When the sheet discharging trays 250 and 260 both have an excessive stack of sheets, the CPU 102 stops outputting.

Figure 5A:
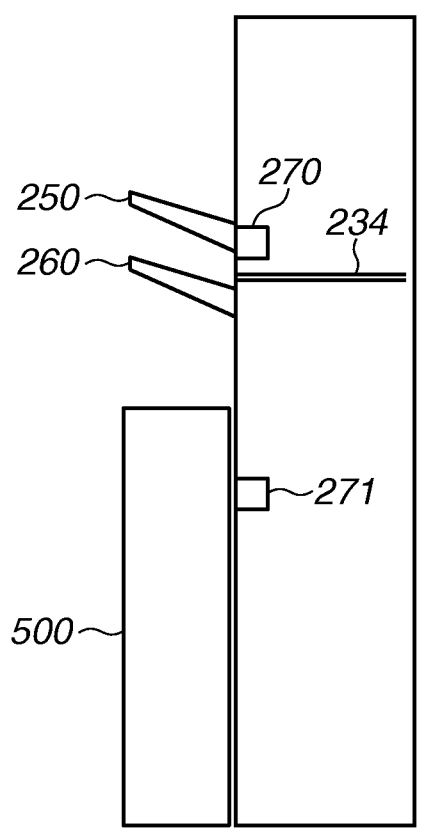
FIGS. 5A and 5B illustrate stack control at the time when a tray becomes full.
Figure 5B:
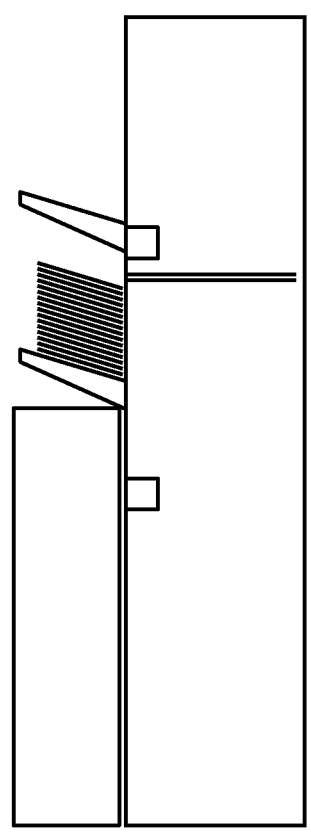
Figure 12A:
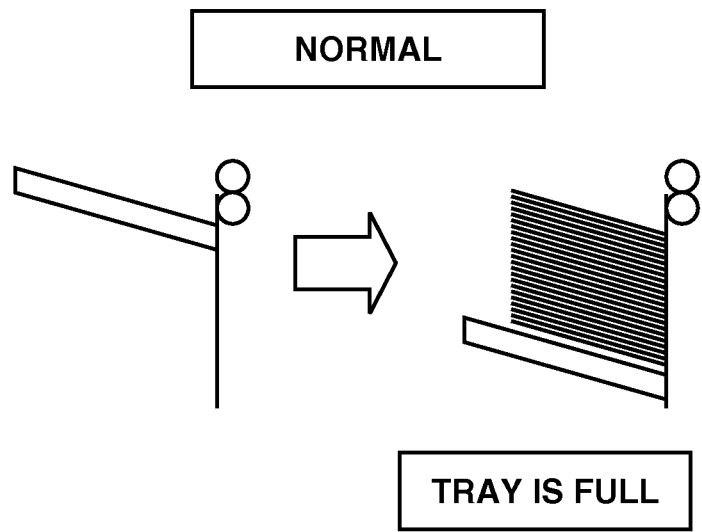
FIGS. 12A and 12B illustrate the relationship between a sheet stacking unit and an obstacle.
Figure 12B:
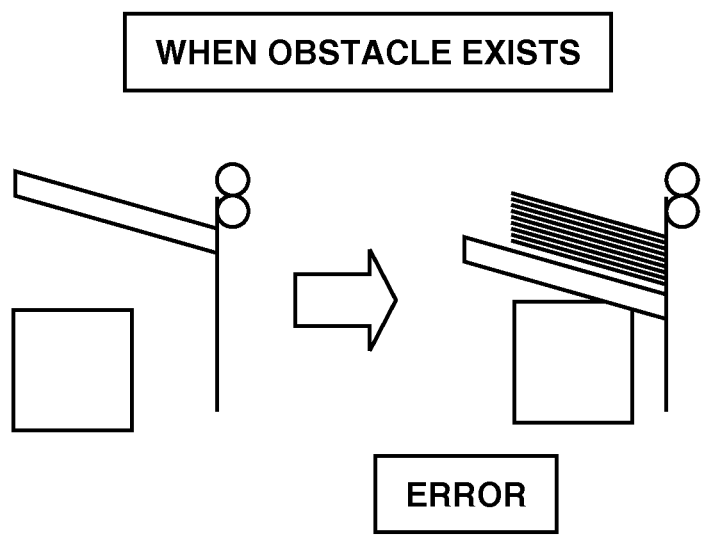

FIGS. 5A and 5B are schematic views illustrating a case where sheets are stacked on the sheet discharging tray 260 located below while a foreign object 500 is present under the sheet discharging tray 260.

FIG. 5A first illustrates a state in which no sheet is stacked on either of the sheet discharging trays 250 and 260. Next, sheets are stacked on the sheet discharging tray 260 as illustrated in FIG. 5B. Each time a sheet is stacked on the sheet discharging tray 260, the CPU 102 gradually moves down the sheet discharging tray 260 to bring the height of the surface of the sheet to the level of the sheet feeding path 234. When the sheet discharging tray 260 having been moved down hits the foreign object 500, the sheet discharging tray 260 falsely becomes excessive stacking.

For example, if an obstacle (foreign object 500) that prevents the sheet discharging tray 260 from moving down is placed under the sheet discharging tray 260 as illustrated in FIGS. 5A and 5B, the sheet discharging tray 260 hits the foreign object 500 and cannot move down any further. If the sheet discharging tray 260 is forced to be moved down further, the load is applied to the sheet discharging tray 260 and the raising/lowering motor 261, and the sheet discharging tray 260 may be damaged. Thus, if the position detecting unit 262 detects that the position of the sheet discharging tray 260 is not changed although the raising/lowering motor 261 is driven, the CPU 102 determines that an abnormality is detected while the sheet discharging tray 260 is moved down, and the CPU 102 stops moving down the sheet discharging tray 260. In this way, the sheet discharging tray 260 and the raising/lowering motor 261 are prevented from being damaged by moving down the sheet discharging tray 260 despite the presence of the obstacle. As described above, in the case where an abnormality is detected while the sheet discharging tray 260 is moved down, the CPU 102 determines that there is an obstacle or the like under the sheet discharging tray 260 and that the sheet discharging tray 260 falsely becomes excessive stacking.

In the case of a normal excessive stack of sheets without a foreign object or the like under the sheet discharging tray 260 as illustrated in FIG. 4B, no sheet is stacked on the sheet discharging tray 250. Thus, the CPU 102 changes the sheet discharging tray as illustrated in FIG. 4C. However, in the case of the falsely excessive stacking with a foreign object or the like placed under the sheet discharging tray 260, the sheet discharging tray 260 cannot be moved down any further. Thus, it is not possible to change the sheet discharging tray, because the sheet discharging tray 260 needs to be moved down further in order to move down the sheet discharging tray 250, which is the other one of the sheet discharging trays, to the level of the sheet feeding path 234. Accordingly, in the case where a foreign object is detected while sheets are stacked on the sheet discharging tray 260 by detecting an abnormality while the sheet discharging tray 260 is moved down, the CPU 102 does not change the sheet discharging tray (prohibits changing). In this case, the CPU 102 causes the MFP to stop printing.

FIGS. 6A to 6D are schematic views illustrating a case where sheets are stacked on the sheet discharging tray 250 located above and thereafter on the sheet discharging tray 260 located below when the foreign object 500 is under the sheet discharging tray 260.

FIG. 6A first illustrates a state in which no sheet is stacked on either of the sheet discharging trays 250 and 260. Next, sheets are stacked on the sheet discharging tray 250 as illustrated in FIG. 6B. Each time a sheet is stacked on the sheet discharging tray 250, the CPU 102 gradually moves down the sheet discharging tray 250 to bring the height of the surface of the sheet to the level of the sheet feeding path 234. Further, the CPU 102 also gradually moves down the sheet discharging tray 260 in accordance with the moving down of the sheet discharging tray 250 so that the sheet discharging tray 260 will not hit the sheet discharging tray 250. When the sheet discharging tray 260 having been moved down hits the foreign object 500, the sheet discharging tray 260 falsely becomes excessive stacking. In this case, the CPU 102 changes the sheet discharging tray to stack subsequent sheets on the sheet discharging tray 260 which is different from the sheet discharging tray 250 which falsely becomes excessive stacking. The case illustrated in FIGS. 6A to 6D is different from the case illustrated in FIGS. 5A and 5B in that even when the sheet discharging tray is changed from the sheet discharging tray 250 to the sheet discharging tray 260, the sheet discharging tray 260 will not hit the foreign object 500 under the sheet discharging tray 260. Thus, in this case, the sheet discharging tray can be changed. In other words, the CPU 102 permits the change from the sheet discharging tray 250 to the sheet discharging tray 260.

Then, FIG. 6C illustrates the state immediately after the sheet discharging tray is changed from the sheet discharging tray 250 to the sheet discharging tray 260. The CPU 102 moves up the sheet discharging tray 250, which has an excessive stack of sheets, to the point of the "sheet discharging tray 250 upper end sensor" 270 and brings the sheet discharging tray 260 to the level of the sheet feeding path 234. Finally, sheets are stacked on the sheet discharging tray 260 as illustrated in FIG. 6D. Each time a sheet is stacked on the sheet discharging tray 260, the CPU 102 gradually moves down the sheet discharging tray 260 to bring the height of the surface of the sheet to the level of the sheet feeding path 234. When the sheet discharging tray 260 having moved down hits the foreign object 500, the sheet discharging tray 260 falsely becomes excessive stacking. Since the sheet discharging trays 250 and 260 both have an excessive stack of sheets, the CPU 102 stops outputting.

FIGS. 7 and 8 are flowcharts illustrating an example of a method of controlling the controller apparatus 101 according to the present exemplary embodiment. The CPU 102 reads from the ROM 115 a control program based on the flowcharts and executes the control program to realize the processes illustrated in the flowcharts.

In step S701, if a user presses a start key of the operation unit 104, the CPU 102 executes printing processing of a copy job by reading a document with the reader unit 105 and printing an image of the read document with the printer unit 108. While the present exemplary embodiment describes the copy job as an example, the job may be any job that is to execute printing such as the print job described above or a fax/print job. When the printing processing in step S701 is completed, then in step S702, the CPU 102 executes processing to move a sheet discharging tray that is designated as an output destination (stacking destination) at this time (hereinafter, the sheet discharging tray will be referred to as "the sheet discharging tray of the output destination"). In the processing executed in step S702, the CPU 102 also determines whether a state is the state in which the sheet can be discharged to the sheet discharging tray of the output destination, the state in which the sheet discharging tray of the output destination is full, or the state in which a foreign object is detected under the sheet discharging tray 260. The processing will be described in detail with reference to FIG. 8.

In step S703, based on the processing result in step S702, the CPU 102 determines whether a foreign object is detected under the sheet discharging tray 260. If the CPU 102 determines that no foreign object is detected under the sheet discharging tray 260 (NO in step S703), the processing proceeds to step S704.

In step S704, based on the processing result in step S702, the CPU 102 determines whether the sheet discharging tray of the output destination is full (has an excessive stack of sheets). The CPU 102 determines whether the sheet discharging tray of the output destination has reached the "excessive sheet stacking detection sensor" 271, as illustrated in detail in FIG. 8. In step S704, if the CPU 102 determines that the sheet discharging tray of the output destination is not full (NO in step S704), the processing proceeds to step S705. In step S705, the CPU 102 discharges the sheet to the sheet discharging tray of the output destination, and the processing proceeds to step S706.

In step S706, the CPU 102 determines whether all the printing of the job is completed. If the CPU 102 determines that the printing is not completed (NO in step S706), the processing returns to step S701, and the printing is continued. On the other hand, in step S706, if the CPU 102 determines that the printing is completed (YES in step S706), the CPU 102 ends the process illustrated in the flowchart.

On the other hand, in step S704, if the CPU 102 determines that the sheet discharging tray of the output destination is full (YES in step S704), the processing proceeds to step S707. In step S707, the CPU 102 determines whether there is any other sheet discharging tray that is not full. If the CPU 102 determines that there is another sheet discharging tray that is not full (YES in step S707), the processing proceeds to step S708. In step S708, the CPU 102 changes the sheet discharging tray of the output destination. Then, the processing proceeds to step S702, and the CPU 102 moves the sheet discharging tray of the output destination.

On the other hand, in step S707, if the CPU 102 determines that there is no other sheet discharging tray that is not full (NO in step S707), the processing proceeds to step S709. In step S709, the CPU 102 controls the operation unit 104 to display a user interface screen as illustrated in FIG. 10 on the display unit of the operation unit 104, and stops the sheet stacking and the print operation.

FIG. 10 illustrates an example of the user interface screen displayed on the display unit of the operation unit 104 in step S709 in FIG. 7.

The user interface screen illustrated in FIG. 10 is to prompt the user to remove the sheets stacked on the sheet discharging tray 250 or 260.

As described above, even after excessive sheets have been stacked on all of the sheet discharging trays, if removal of the sheets stacked on any one of the sheet discharging trays is detected, the CPU 102 moves to the level of the sheet feeding path 234 the sheet discharging tray from which the sheets have been removed. Then, the CPU 102 discharges the sheet to the sheet discharging tray from which the sheets have been removed, and the processing returns to step S701 to restart printing. The foregoing control can prevent a decrease in productivity.

Further, in step S703, if the CPU 102 determines that a foreign object is detected under the sheet discharging tray 260 (YES in step S703), the processing proceeds to step S710. In step S710, the CPU 102 determines whether there is any other sheet discharging tray that is not full. If the CPU 102 determines that there is no other sheet discharging tray that is not full (NO in step S710), the processing proceeds to step S711. In step S711, the CPU 102 controls the operation unit 104 to display a user interface screen as illustrated in FIG. 11 on the display unit of the operation unit 104, and stops the sheet stacking and the print operation.

FIG. 11 illustrates an example of the user interface screen displayed on the display unit of the operation unit 104 in step S711 in FIG. 7.

The user interface screen illustrated in FIG. 11 is to prompt the user to remove the sheets stacked on the sheet discharging tray or to remove the foreign object placed under the sheet discharging tray. A button 11001 is to be pressed by the user when the user removes the foreign object (obstacle).

For example, in a case where the foreign object under the sheet discharging tray 260 becomes an obstacle to cause the sheet discharging tray 260 to falsely become excessive stacking, if removal of the sheets stacked on the sheet discharging tray 260 is detected, the CPU 102 moves up the sheet discharging tray 260 to the level of the sheet feeding path 234. Further, in a case where the sheet discharging tray 250 falsely becomes excessive stacking, if removal of the sheets stacked on the sheet discharging tray 250 or 260 is detected, the CPU 102 moves up the sheet discharging tray from which the sheets have been removed to the level of the sheet feeding path 234. Furthermore, if removal of the foreign object is detected, the CPU 102 moves down the sheet discharging tray of the output destination to bring the height of the sheet bundle stacked on the sheet discharging tray of the output destination (stacking destination) to the level of the sheet feeding path 234.

Then, the CPU 102 discharges the sheet to the sheet discharging tray, and the processing returns to step S701 to restart printing. The foregoing control can prevent a decrease in productivity.

In a case where the button 11001 in FIG. 11 is pressed, the CPU 102 detects that the foreign object (obstacle) has been removed and also determines that the abnormality at the time of moving down the sheet discharging tray 260 has been solved. A sensor may be disposed to detect a foreign object present under the sheet discharging tray 260, and removal of the foreign object may be detected based on a signal from the sensor.

Now, return to the description of the flowchart in FIG. 7.

In step S710, if the CPU 102 determines that there is another sheet discharging tray that is not full (YES in step S710), the processing proceeds to step S712. In step S712, the CPU 102 determines whether a tray change to the sheet discharging tray that is not full is possible. Whether the tray change is possible is determined based on a tray change possibility table (see FIG. 9) stored in the ROM 115.

FIG. 9 is a schematic diagram illustrating the tray change possibility table in the ROM 115 that is referred to by the CPU 102 in step S712 in FIG. 7.

The tray change possibility table includes items "current output destination," "output destination after tray change," and "possibility of tray change." In the tray change possibility table illustrated in FIG. 9, if the current output destination is the sheet discharging tray 250 and the output destination after the tray change is the sheet discharging tray 260, the CPU 102 determines that the tray change (tray switch) is possible. Further, if the current output destination is the sheet discharging tray 260 and the output destination after the tray change is the sheet discharging tray 250, the CPU 102 determines that the tray change (tray switch) is not possible.

Now, return to the description of the flowchart in FIG. 7.

In step S712, if the CPU 102 determines that the tray change to the sheet discharging tray that is not full is not possible (NO in step S712), the CPU 102 prohibits the change of the sheet discharging tray and executes step S711 described above. Description of the details of step S711 is omitted.

On the other hand, in step S712, if the CPU 102 determines that the tray change to the sheet discharging tray that is not full is possible (YES in step S712), the CPU 102 permits the change of the sheet discharging tray, and the processing proceeds to step S713. In step S713, the CPU 102 changes the sheet discharging tray of the output destination. Then, the processing proceeds to step S702, and the CPU 102 executes a process of moving a sheet discharging tray of an output destination.

The following describes the process of moving the sheet discharging tray of the output destination in step S702 in FIG. 7, with reference to FIG. 8.

In step S801, the CPU 102 determines whether the sheet discharging tray of the output destination is the sheet discharging tray 250. If the CPU 102 determines that the sheet discharging tray of the output destination is not the sheet discharging tray 250 (NO in step S801), the processing proceeds to step S802.

In step S802, the CPU 102 moves up the sheet discharging tray 250 to the level of the "sheet discharging tray 250 upper end sensor" 270, and the processing proceeds to step S803.

In step S803, the CPU 102 moves the sheet surface of the sheet bundle stacked on the sheet discharging tray 260 to the level of the sheet feeding path 234, and the processing proceeds to step S804.

In step S804, the CPU 102 determines whether the sheet discharging tray 260 has reached the "excessive sheet stacking detection sensor" 271. If the CPU 102 determines that the sheet discharging tray 260 has reached the "excessive sheet stacking detection sensor" 271 (YES in step S804), the processing proceeds to step S806. In step S806, the CPU 102 determines that the sheet discharging tray 260 is in the tray full state, and the processing proceeds to step S703 in FIG. 7.

On the other hand, in step S804, if the CPU 102 determines that the sheet discharging tray 260 has not reached the "excessive sheet stacking detection sensor" 271 (NO in step S804), the processing proceeds to step S805. In step S805, the CPU 102 determines whether an abnormality is detected while the sheet discharging tray 260 is moved down. If the CPU 102 determines that no abnormality is detected while the sheet discharging tray 260 is moved down (NO in step S805), the processing proceeds to step S807. In step S807, the CPU 102 determines that the sheet can be discharged to the sheet discharging tray 260, and the processing proceeds to step S703 in FIG. 7.

On the other hand, in step S805, if the CPU 102 determines that an abnormality is detected while the sheet discharging tray 260 is moved down (YES in step S805), the processing proceeds to step S811. In step S811, the CPU 102 determines that a foreign object is detected (foreign object detected state), and the processing proceeds to step S703 in FIG. 7. In the case where the processing proceeds from step S805 to S811, the CPU 102 also determines that the sheet discharging tray 260 is falsely in the tray full state.

In step S801, if the CPU 102 determines that the sheet discharging tray of the output destination is the sheet discharging tray 250 (YES in step S801), the processing proceeds to step S808. In step S808, the CPU 102 moves the sheet surface of the sheet bundle stacked on the sheet discharging tray 250 to the level of the sheet feeding path 234, and the processing proceeds to step S809. In step S809, the CPU 102 moves down the sheet discharging tray 260 so that the sheet surface of the sheet bundle stacked on the sheet discharging tray 260 will not hit the sheet discharging tray 250, and the processing proceeds to step S810. Specifically, in the case of moving down the sheet discharging tray 250, the CPU 102 moves down the sheet discharging tray 260 according to the distance between the sheet discharging trays 250 and the sheet discharging tray 260 located below the sheet discharging tray 250. In a case where a sheet bundle is stacked on the sheet discharging tray 260, the distance between the sheet discharging trays 250 and 260 is the distance between the sheet bundle and the sheet discharging tray 250.

In step S810, the CPU 102 determines whether an abnormality is detected while the sheet discharging tray 260 is moved down. If the CPU 102 determines that an abnormality is detected while the sheet discharging tray 260 is moved down (YES in step S810), the processing proceeds to step S811. In step S811, the CPU 102 determines that a foreign object is detected (foreign object detected state), and the processing proceeds to step S703 in FIG. 7. In the case where the processing proceeds from step S810 to S811, the CPU 102 also determines that the sheet discharging tray 250 is falsely in the tray full state.

On the other hand, in step S810, if the CPU 102 determines that no abnormality is detected while the sheet discharging tray 260 is moved down (NO in step S810), the processing proceeds to step S812. In step S812, the CPU 102 determines whether the sheet discharging tray 250 has reached the "excessive sheet stacking detection sensor" 271. If the CPU 102 determines that the sheet discharging tray 250 has not reached the "excessive sheet stacking detection sensor" 271 (NO in step S812), the processing proceeds to step S813. In step S813, the CPU 102 determines that the sheet can be discharged to the sheet discharging tray 250, and the processing proceeds to step S703 in FIG. 7.

On the other hand, in step S812, if the CPU 102 determines that the sheet discharging tray 250 has reached the "excessive sheet stacking detection sensor" 271 (YES in step S812), the processing proceeds to step S814. In step S814, the CPU 102 determines that the sheet discharging tray 250 is in the tray full state, and the processing proceeds to step S703 in FIG. 7.

As described above, even when the obstacle prevents the sheet discharging tray of the sheet discharging destination from being moved down, if the sheet discharging tray of the sheet discharging destination is the sheet discharging tray 250 located above, the sheet discharging destination can be changed to the sheet discharging tray 260 located below, and the sheet discharging and printing may be continued, whereby more sheets can be stacked. On the other hand, when the sheet discharging tray of the sheet discharging destination is the sheet discharging tray 260 located below, the sheet discharging and printing may be stopped to prevent the apparatus from being damaged by forcibly moving the sheet discharging tray 260.

While the foregoing exemplary embodiment describes the case where there are two sheet discharging trays, the discharging trays may be three or more.

In this case, when a foreign object is detected under the lowermost (lowest) sheet discharging tray, if a space is available on the sheet discharging tray located below the current sheet discharging tray, the CPU 102 determines that the sheet discharging tray can be changed to the sheet discharging tray located below. On the other hand, when no space is available on the sheet discharging tray located below the current sheet discharging tray, even if a space is available on the sheet discharging tray located above the current sheet discharging tray, the CPU 102 determines that it is not possible to change the sheet discharging tray to the sheet discharging tray located above. In other words, in the case where the foreign object is detected, the CPU 102 permits the change to the sheet discharging tray located below the current sheet discharging tray, and continues the sheet stacking and the printing processing. However, the CPU 102 limits (prohibits) the change to the sheet discharging tray located above the current sheet discharging tray, and stops the sheet stacking and the printing processing.

By the foregoing controls, even when the obstacle prevents the sheet discharging tray of the sheet discharging destination from being moved down, if a space is available on the sheet discharging tray located below the sheet discharging tray of the sheet discharging destination, the sheet discharging tray is changed, and the sheet discharging and the printing are continued, whereby more sheets can be stacked. On the other hand, if the sheet discharging tray of the sheet discharging destination is the lowermost sheet discharging tray or if no space is available on the sheet discharging tray located below the sheet discharging tray of the sheet discharging destination, the sheet discharging and the printing are stopped to prevent the sheet discharging tray from being forcibly moved to damage the apparatus.

Accordingly, even when the obstacle prevents the sheet discharging tray from being moved down, the sheet stacking apparatus can be prevented from being broken or damaged and, when possible, stacking of more sheets can be performed to continue the printing processing.

The configurations and contents of various types of data are not limited to those described above, and the various types of data may have various configurations and contents according to the intended use or the purpose of use.

While exemplary embodiments are described above, the present invention is also applicable to, for example, a system, an apparatus, a method, a program, a storage medium, etc. Specifically, the present invention is applicable to a system including multiple devices or an apparatus including a single device.

Further, combinations of the above described exemplary embodiments are also encompassed within the scope of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094483, filed May 1, 2014, which is hereby incorporated by reference herein in its entirety.

What is claimed is:

1. A sheet stacking apparatus configured to discharge a sheet to a first sheet stacking tray configured to be moved up and down and a second sheet stacking tray located below the first sheet stacking tray and configured to be moved up and down, the sheet stacking apparatus comprising:
   a discharging unit configured to discharge a sheet to the first sheet stacking tray or the second sheet stacking tray;
   a position detecting unit configured to detect that a position of the second discharge tray has not changed; and
   a control unit configured to determine, based on detection that the position of the second discharge tray has not changed, that an obstacle exists under the second discharge tray and to perform control to change a destination of a sheet to be discharged by the discharging unit from the first sheet stacking tray to the second sheet stacking tray in a case where the obstacle prevents the second sheet stacking tray from being moved down while the discharging unit is discharging a sheet to the first sheet stacking tray.

2. The sheet stacking apparatus according to claim 1, wherein in a case where the obstacle prevents the second sheet stacking tray from being moved down while the discharging unit is discharging a sheet to the second sheet stacking tray, the control unit performs control not to change the destination of a sheet to be discharged by the discharging unit from the second sheet stacking tray to the first sheet stacking tray.

3. The sheet stacking apparatus according to claim 1, further comprising a notification unit configured to provide a notification to prompt a user to remove the obstacle in a case where the obstacle prevents the second sheet stacking tray from being moved down while the discharging unit is discharging a sheet to the second sheet stacking tray.

4. The sheet stacking apparatus according to claim 1, wherein in a case where the second sheet stacking tray is prevented from being moved down while the discharging unit is discharging a sheet to the first sheet stacking tray, the control unit performs control to stop discharging a sheet to the first sheet stacking tray by the discharging unit.

5. The sheet stacking apparatus according to claim 1, wherein in a case where the second sheet stacking tray is prevented from being moved down because the amount of sheets stacked on the second sheet stacking tray has reached a predetermined amount while the discharging unit is discharging a sheet to the second sheet stacking tray, the control unit performs control to change the destination of a sheet to be discharged by the discharging unit from the second sheet stacking tray to the first sheet stacking tray.

6. The sheet stacking apparatus according to claim 1, further comprising a printing unit configured to print an image on a sheet,
wherein the discharging unit discharges the sheet on which the image has been printed by the printing unit.

7. A method of controlling a sheet stacking apparatus configured to discharge a sheet to a first sheet stacking tray configured to be moved up and down and a second sheet stacking tray located below the first sheet stacking tray and configured to be moved up and down, the method comprising:
discharging a sheet to the first sheet stacking tray or the second sheet stacking tray;
detecting that a position of the second discharge tray has not changed;
determining, based on detection that the position of the second discharge tray has not changed, that an obstacle exists under the second discharge tray; and
performing control to change a destination of a sheet to be discharged by the discharging from the first sheet stacking tray to the second sheet stacking tray in a case where the obstacle prevents the second sheet stacking tray from being moved down while the discharging is discharging a sheet to the first sheet stacking tray.

8. A non-transitory storage medium storing a program for causing a computer to execute a method of controlling a sheet stacking apparatus configured to discharge a sheet to a first sheet stacking tray configured to be moved up and down and a second sheet stacking tray located below the first sheet stacking tray and configured to be moved up and down, the program comprising:
discharging a sheet to the first sheet stacking tray or the second sheet stacking tray;
detecting that a position of the second discharge tray has not changed;
determining, based on detection that the position of the second discharge tray has not changed, that an obstacle exists under the second discharge tray; and
performing control to change a destination of a sheet to be discharged by the discharging from the first sheet stacking tray to the second sheet stacking tray in a case where the obstacle prevents the second sheet stacking tray from being moved down while the discharging is discharging a sheet to the first sheet stacking tray.

* * * * *